US011120823B1

(12) United States Patent
Nesori et al.

(10) Patent No.: US 11,120,823 B1
(45) Date of Patent: Sep. 14, 2021

(54) SUSPENSION ASSEMBLY AND DISK DEVICE

(71) Applicants: Kabushiki Kaisha Toshiba, Tokyo (JP); Toshiba Electronic Devices & Storage Corporation, Tokyo (JP)

(72) Inventors: Hirofumi Nesori, Chuo Tokyo (JP); Kenichiro Aoki, Machida Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/003,166

(22) Filed: Aug. 26, 2020

(30) Foreign Application Priority Data

Mar. 13, 2020 (JP) .............................. JP2020-043921

(51) Int. Cl.
*G11B 5/48* (2006.01)

(52) U.S. Cl.
CPC .......... *G11B 5/4826* (2013.01); *G11B 5/4853* (2013.01)

(58) Field of Classification Search
CPC ............................ G11B 5/4826; G11B 5/4853
USPC .............................................. 360/245–245.6
See application file for complete search history.

(56) References Cited

U.S. PATENT DOCUMENTS

| 5,759,418 A * | 6/1998 | Frater | G11B 21/16 216/22 |
| 6,282,063 B1 | 8/2001 | Coon | |
| 2010/0085663 A1* | 4/2010 | Ando | G11B 5/4826 360/244.2 |
| 2010/0195252 A1* | 8/2010 | Kashima | G11B 5/483 360/294.4 |
| 2015/0138739 A1 | 5/2015 | Hishiki | |

FOREIGN PATENT DOCUMENTS

JP          H7-153215 A        6/1995

* cited by examiner

*Primary Examiner* — Allen T Cao
(74) *Attorney, Agent, or Firm* — White & Case LLP (57) ABSTRACT

According to one embodiment, a suspension assembly includes a support plate having a distal end portion and a base end portion, a wiring member having a gimbal portion and provided on the support plate, and a magnetic head mounted on the gimbal portion. In the gimbal portion, the wiring member includes a head mounting region where the magnetic head is mounted, and an etching region including a recess located and formed at least partially in the head mounting region. The magnetic head is bonded to the head mounting region of the wiring member by an adhesive filled in the head mounting region and the recess.

14 Claims, 10 Drawing Sheets

SUSPENSION ASSEMBLY AND DISK DEVICE

CROSS-REFERENCE TO RELATED APPLICATIONS

This application is based upon and claims the benefit of priority from Japanese Patent Application No. 2020-043921, filed Mar. 13, 2020, the entire contents of which are incorporated herein by reference.

FIELD

Embodiments described herein relate generally to a suspension assembly used in a disk device and the disk device including the suspension assembly.

BACKGROUND

As a disk device, for example, a hard disk drive (HDD) includes a plurality of magnetic disks rotatably arranged in a housing, a plurality of magnetic heads for reading and writing information on the magnetic disks, and a magnetic head actuator for movably supporting the magnetic heads on the magnetic disk.

The head actuator has an actuator block that is rotatably supported, and a plurality of suspension assemblies (may be referred to as gimbal assemblies) that extend from the actuator block and support the magnetic heads at their distal end portions. The suspension assembly has a base plate having one end fixed to an arm, a load beam extending from the base plate, and a flexure (wiring member) provided on the load beam and the base plate. The flexure has a displaceable gimbal portion, and the magnetic heads are mounted on the gimbal portion.

Usually, the magnetic head is attached and fixed to the distal end portion of the suspension or the gimbal portion of the flexure with an adhesive. When a plurality of wirings pass through the gimbal portion of the flexure, since the magnetic head is bonded over the wirings, there is a possibility that bonding may not be stable.

DETAILED DESCRIPTION

Various embodiments will be described hereinafter with reference to the accompanying drawings. In general, according to one embodiment, a suspension assembly comprises a support plate including a distal end portion and a base end portion, a wiring member having a gimbal portion and provided on the support plate, and a magnetic head mounted on the gimbal portion. In the gimbal portion, the wiring member includes a head mounting region in which the magnetic head is mounted, and an etching region including a recess located and formed at least partially in the head mounting region, and the magnetic head is bonded to the head mounting region of the wiring member by the adhesive filled in the head mounting region and the recess.

It should be noted that the disclosure is merely an example, and appropriate changes that can be easily conceived by those skilled in the art without departing from the scope of the present invention are naturally included in the scope of the present invention. In order to make the description clearer, the drawings may schematically show the width, thickness, shape, and the like of each part as compared with the actual mode, however, this is merely an example, and the interpretation of the present invention is not limited thereto. In the specification and the drawings, the same elements as those previously described with reference to previous drawings are denoted by the same reference numerals, and detailed description thereof may be appropriately omitted.

First Embodiment

As a disk device, a hard disk drive (HDD) according to the embodiment will be described in detail.

Figure 1:
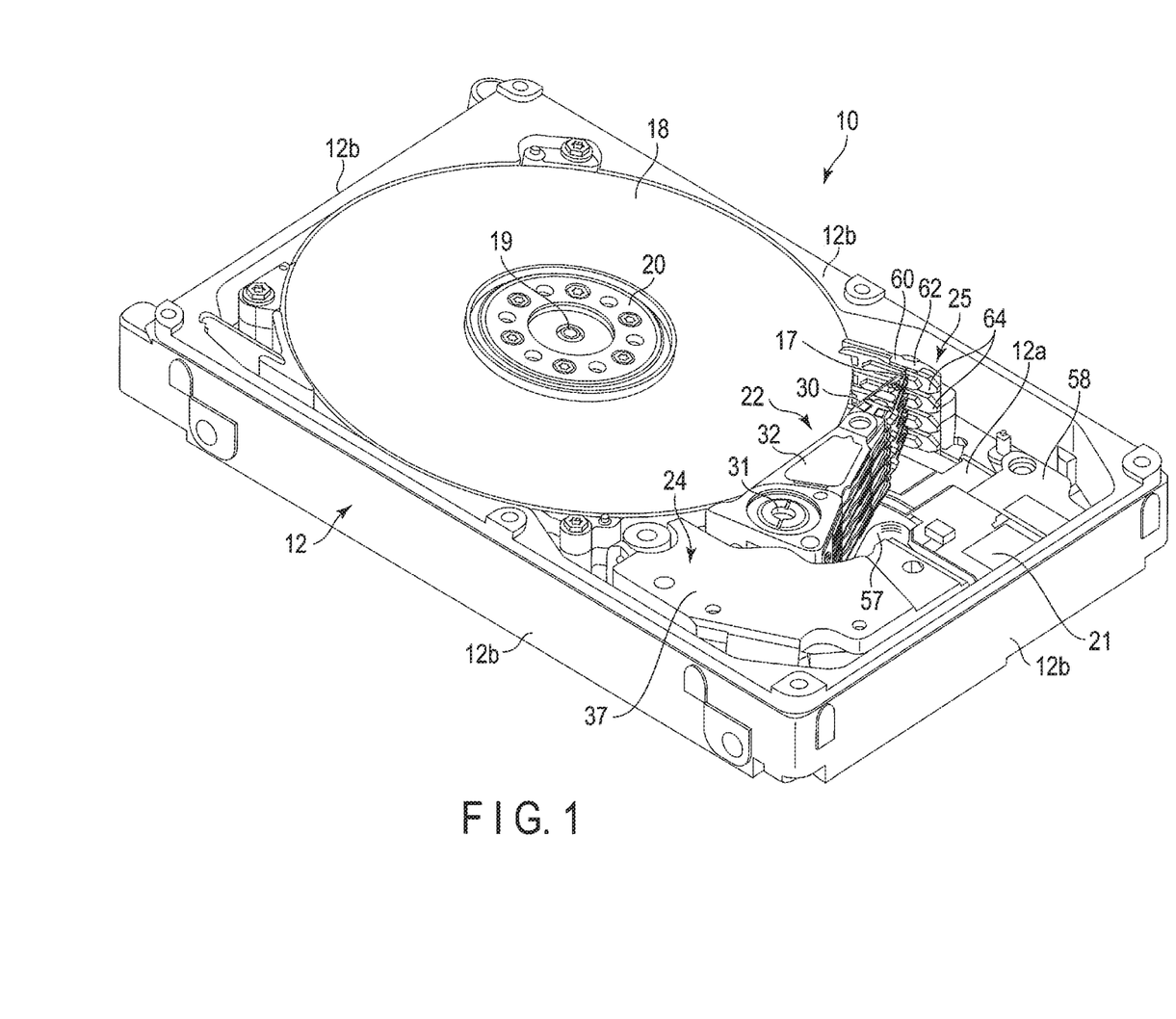
FIG. 1 is a perspective view illustrating a hard disk drive (HDD) according to a first embodiment.

FIG. 1 is a perspective view of the HDD according to the embodiment shown with a top cover removed.

As illustrated, the HDD includes a rectangular housing 10. The housing 10 comprises a rectangular box-shaped base 12 having an open top surface, and a top cover (not shown). The base 12 comprises a rectangular bottom wall 12a and side walls 12b erected along a peripheral edge of the bottom wall 12a, and is integrally formed of aluminum, for example. The top cover is formed of, for example, stainless steel into a rectangular plate shape, and is screwed onto the side walls 12b of the base 12 with a plurality of screws.

A plurality of magnetic disks 18 as disk-shaped recording media and a spindle motor 19 for supporting and rotating the magnetic disks 18 are provided in the housing 10. The spindle motor 19 is disposed on the bottom wall 12a. Each magnetic disk 18 includes a substrate made of a disk-shaped non-magnetic material such as glass or aluminum having a diameter of 95 mm (3.5 inches), and a magnetic recording layer formed on an upper surface (a first surface) and a lower surface (a second surface) of the substrate. The magnetic disks 18 are coaxially fitted to a hub (not shown) of the spindle motor 19 and further clamped by a clamp spring 20. Thus, the magnetic disks 18 are supported positioned parallel to the bottom wall 12a of the base 12. The magnetic disks 18 are rotated at a predetermined rotation speed by the spindle motor 19.

In the present embodiment, for example, four magnetic disks 18 are arranged in the housing 10, however, the number of magnetic disks 18 is not limited to this, but may be three or less, or five or more.

In the housing 10, there are provided a plurality of magnetic heads 17 for recording/reading information on/from the magnetic disks 18, and an actuator assembly 22 movably supporting the magnetic heads 17 on the magnetic disks 18. In the housing 10, there are further provided a voice coil motor (VCM) 24 for rotating and positioning the actuator assembly 22, a ramp load mechanism 25 for holding the magnetic head 17 at an unload position away from the magnetic disk 18 when the magnetic head 17 is moved to the outermost circumference of the magnetic disk 18, and a board unit (FPC unit) 21 on which electronic components such as a conversion connector are mounted.

A printed circuit board (not shown) is screwed to an outer surface of the bottom wall 12a of the base 12. The printed circuit board constitutes a controller that controls an operation of the spindle motor 19 and controls operations of the VCM 24 and the magnetic head 17 through the board unit 21.

Figure 2:
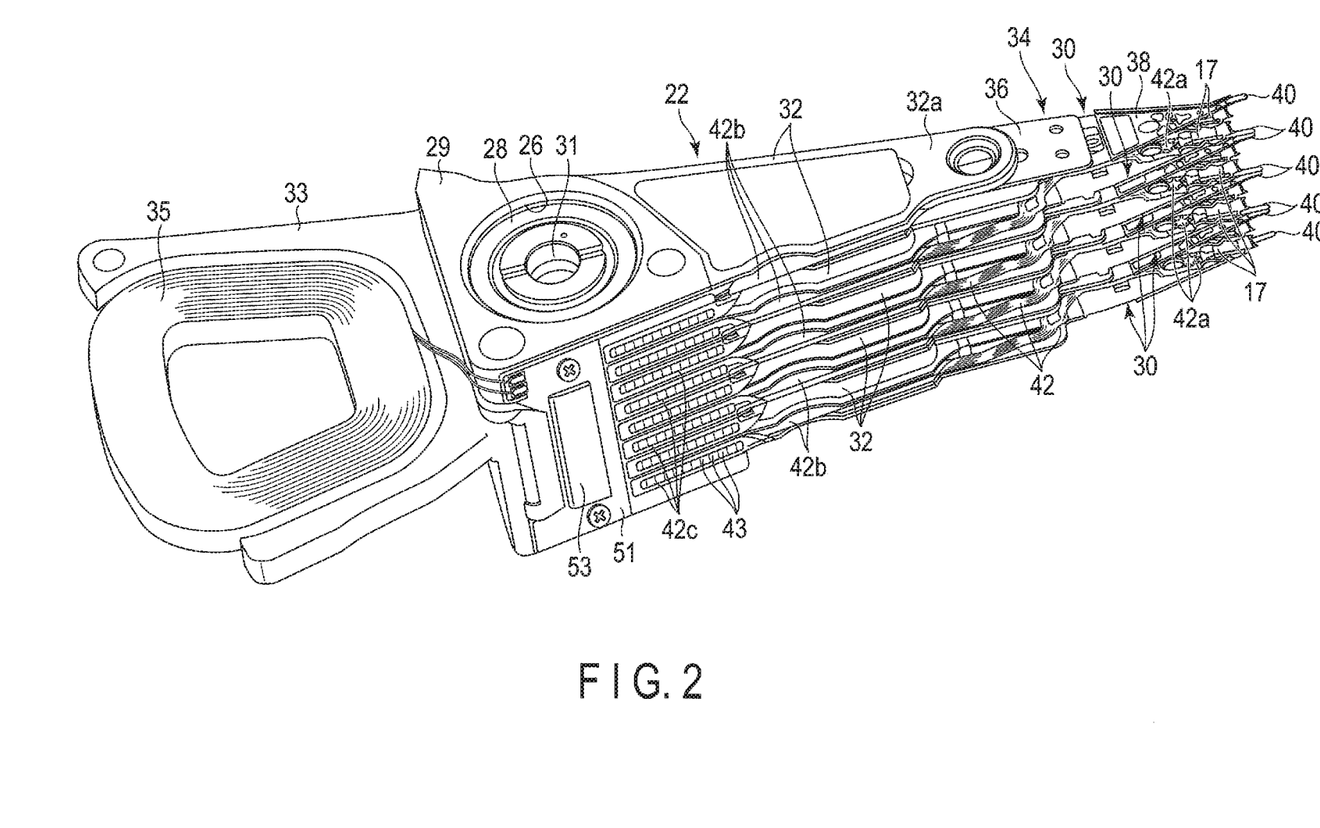
FIG. 2 is a perspective view illustrating an actuator assembly of the HDD.

FIG. 2 is a perspective view illustrating the actuator assembly 22. As illustrated, the actuator assembly 22 includes an actuator block 29 having a through-hole 26, a bearing unit (unit bearing) 28 provided in the through-hole 26, a plurality of, for example, five arms 32 extending from the actuator block 29, a suspension assembly 30 attached to each arm 32, and the magnetic head 17 supported by the suspension assembly 30. The actuator block 29 is rotatably supported by the bearing unit 28 around a support shaft (pivot shaft) 31 erected on the bottom wall 12a.

In the present embodiment, the actuator block 29 and the five arms 32 are integrally molded of aluminum or the like to form a so-called E-block. The arms 32 are, for example, formed in an elongated flat plate shape, and extend from the actuator block 29 in a direction perpendicular to the support shaft 31. The five arms 32 are provided in parallel with each other with gaps therebetween.

The actuator assembly 22 has a support frame 33 extending from the actuator block 29 in a direction opposite to the arms 32. A voice coil 35 constituting a part of the VCM 24 is supported by the support frame 33. As illustrated in FIG. 1, the voice coil 35 is located between a pair of yokes 37, one of which is fixed on the base 12, and constitutes the VCM 24 together with the yokes 37 and a magnet fixed to any one of the yokes 37.

As illustrated in FIG. 2, the actuator assembly 22 includes eight suspension assemblies 30 each supporting the magnetic head 17, and the suspension assemblies 30 are respectively attached to distal end portions 32a of the arms 32. The suspension assemblies 30 include an up-head suspension assembly that supports the magnetic head 17 upward and a down-head suspension assembly that supports the magnetic head 17 downward. The up-head suspension assembly and the down head suspension assembly are configured by arranging the suspension assemblies 30 having the same structure in different vertical directions.

In the present embodiment, in FIG. 2, a down-head suspension assembly 30 is attached to the uppermost arm 32, and an up-head suspension assembly 30 is attached to the lowermost arm 32. The up-head suspension assembly 30 and the down-head suspension assembly 30 are attached to each of the three middle arms 32.

Next, an example of the suspension assembly 30 will be described in detail.

Figure 3:
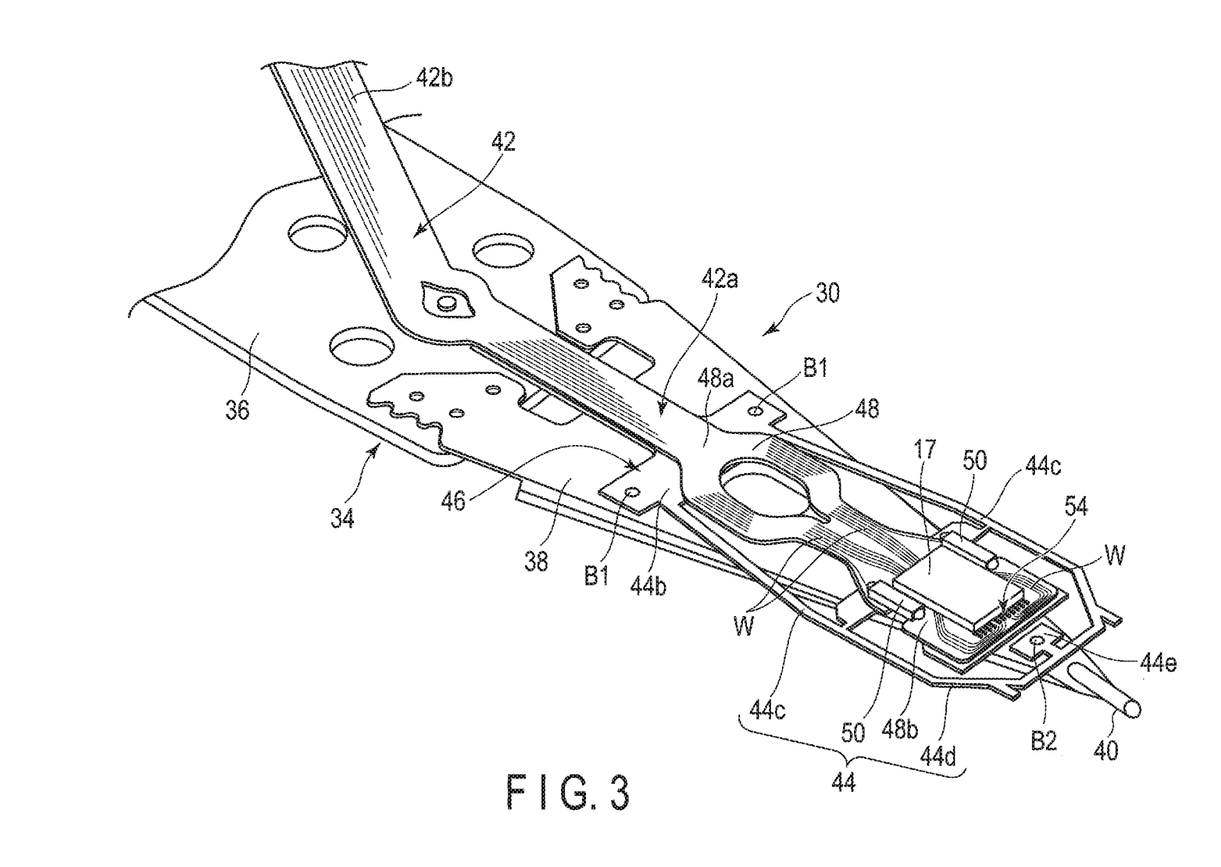
FIG. 3 is a perspective view illustrating a head suspension assembly of the actuator assembly.
Figure 4:
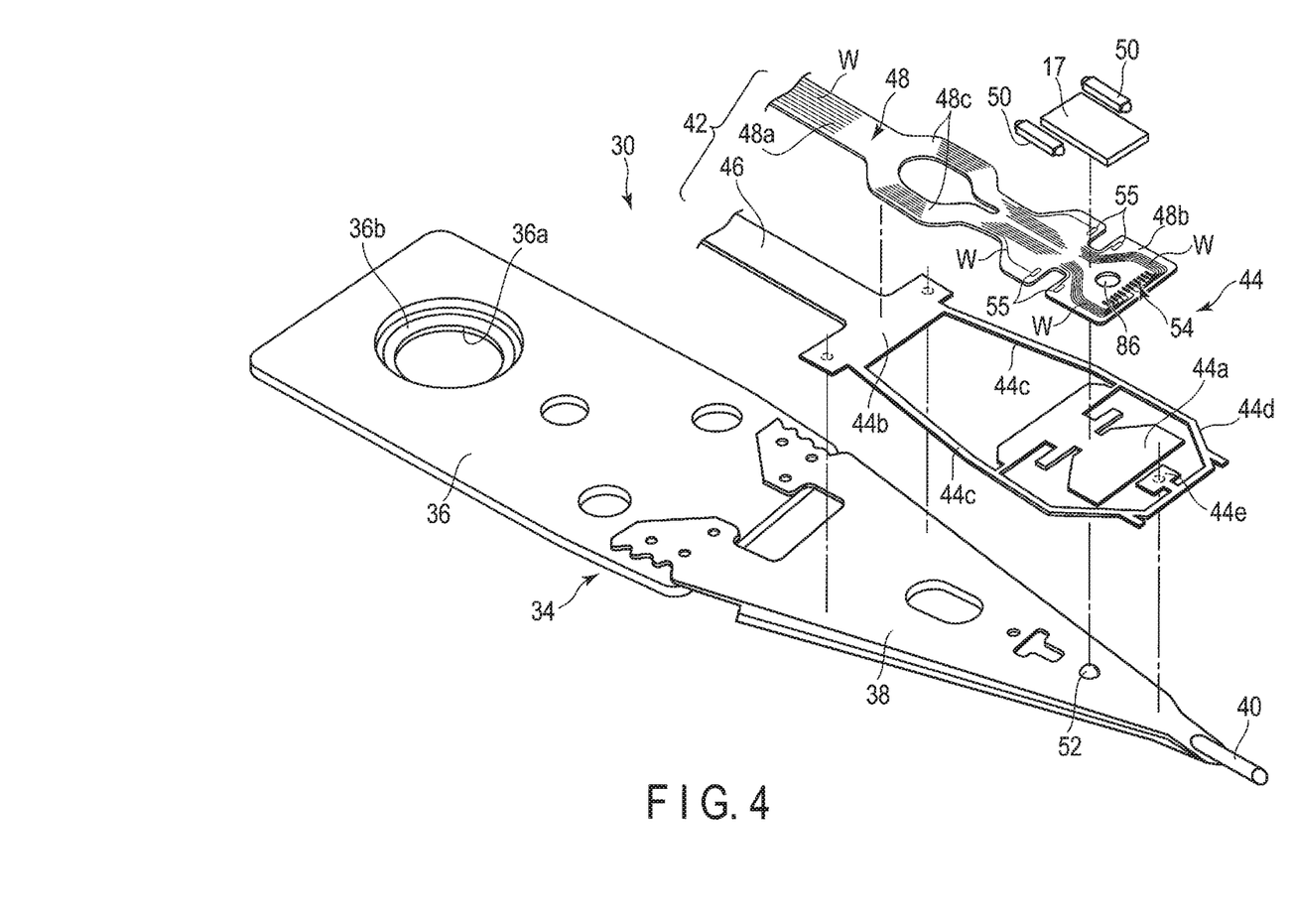
FIG. 4 is an exploded perspective view of the head suspension assembly.
Figure 5:
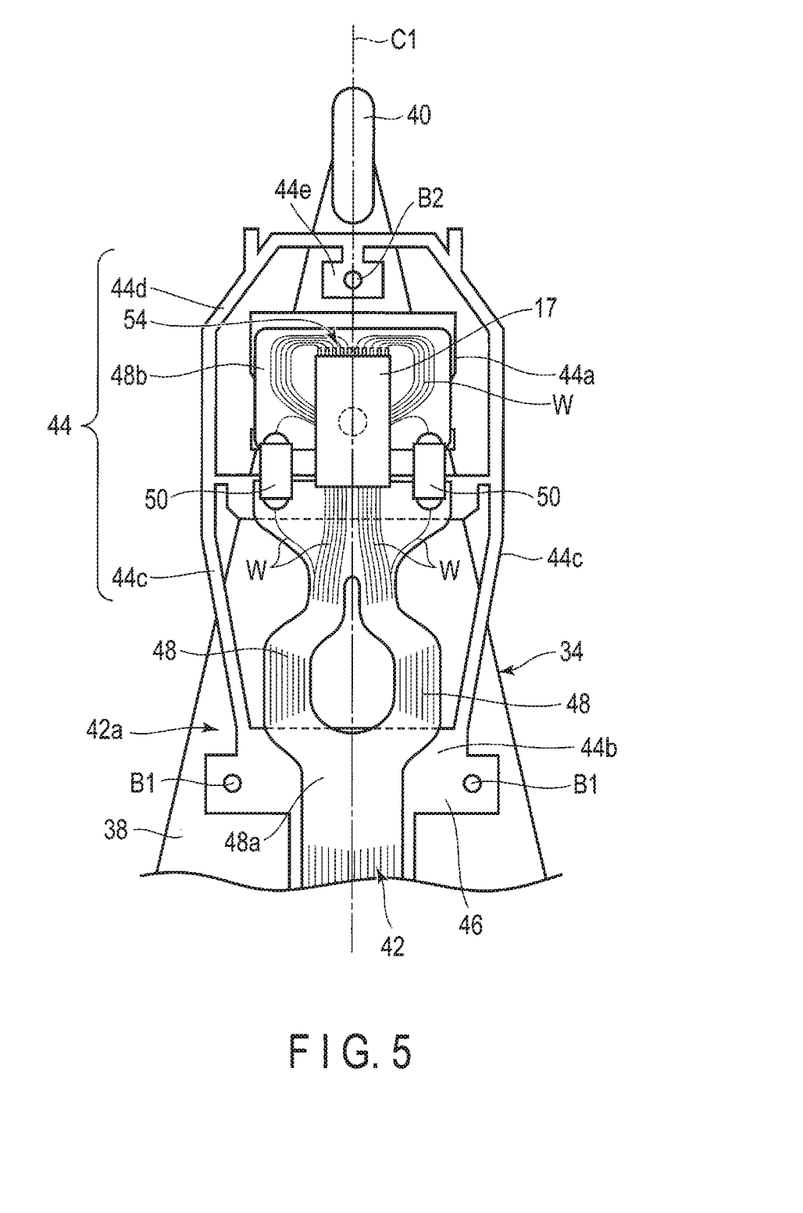
FIG. 5 is a plan view of the head suspension assembly.

FIG. 3 is a perspective view illustrating the suspension assembly, FIG. 4 is an exploded perspective view of the suspension assembly, and FIG. 5 is a plan view of the suspension assembly.

As illustrated in FIGS. 3 and 4, each suspension assembly 30 has a suspension 34 extending from the arm 32, and the magnetic head 17 is attached to the distal end portion of the suspension 34. The magnetic head 17 and the suspension assembly 30 supporting the magnetic head 17 are collectively referred to as a head suspension assembly.

The suspension 34, which functions as a support plate, has a rectangular base plate 36 made of a metal plate having a thickness of several hundred microns and an elongated leaf spring-shaped load beam 38 made of a metal plate having a thickness of several tens of microns. The load beam 38 has its base end portion disposed to overlap the distal end portion of the base plate 36, and is fixed to the base plate 36 by welding a plurality of places. A distal end portion of the load beam 38 constitutes the distal end portion of the support plate, and the base end portion of the load beam 38 and the base plate 36 constitute the base end portion of the support plate. A width of the base end portion of the load beam 38 is formed substantially equal to that of the base plate 36. A rod-shaped tab 40 is provided projecting at a tip of the load beam 38.

The base plate 36 has a circular opening 36a at its base end portion and an annular protuberance 36b located around the opening 36a. The base plate 36 is fastened to the distal end portion 32a of the arm 32 by fitting the protuberance 36b into a circular caulking hole (not shown) formed on a caulking seat surface of the arm 32 and caulking the protuberance 36b. A base end of the base plate 36 may be fixed to the distal end portion 32a of the arm 32 by laser welding, spot welding, or adhesion.

The suspension assembly 30 has an elongated strip-shaped flexure (wiring member) 42 for transmitting a recording/reading signal and a drive signal for a piezoelectric element, and a pair of piezoelectric elements (for example, PZT elements) 50 mounted on the flexure 42. As illustrated in FIGS. 2 and 3, the flexure 42 has a tip side portion 42a disposed on the load beam 38 and the base plate 36, a base end side portion 42b extending outward from a side edge of the base plate 36 and extending to the actuator block 29 along the side edge of the arm 32, and a connecting end portion 42c extending from an extending end of the base end side portion 42b. The connecting end portion 42c has a plurality of connection pads (electrode pads) 43 provided side by side. The connection pads 43 are electrically joined to connection terminals of a wiring board 51 provided in the actuator block 29.

As illustrated in FIGS. 3, 4 and 5, a distal end portion of the flexure 42 is located above the distal end portion of the load beam 38 and constitutes a gimbal portion 44 that functions as an elastic support. The magnetic head 17 is placed and fixed on the gimbal portion 44, and is supported by the load beam 38 through the gimbal portion 44. The pair of piezoelectric elements 50 as drive elements are mounted on the gimbal portion 44 and arranged on both sides of the magnetic head 17.

The flexure 42 has a metal thin plate (metal plate) 46 such as stainless steel serving as a base, and a strip-shaped laminated member (flexible printed wiring board: FPC) 48 attached or fixed on the metal thin plate 46, and forms an elongated laminated plate. The laminated member (FPC) 48 has a base insulating layer (first insulating layer) mostly fixed to the metal thin plate 46, a conductive layer (wiring pattern) which is formed on the base insulating layer and constitutes a plurality of signal wirings, drive wirings, and a plurality of connection pads, and a cover insulating layer (second insulating layer) which covers the conductive layer and is laminated on the base insulating layer. As the conductive layer, for example, a copper foil is used, and the signal wirings, the drive wirings, and the connection pads 43 are formed by patterning the copper foil.

At the tip side portion 42a of the flexure 42, the metal thin plate 46 is attached to surfaces of the load beam 38 and the base plate 36, or spot-welded at a plurality of welding points. In one example, the metal thin plate 46 has two welding points (a first welding portion) B1 welded to the base end portion of the load beam 38 and one welding point (a second welding portion) B2 welded to the distal end portion of the load beam 38. That is, the metal thin plate 46 is welded to the load beam 38 at least at two points of the welding point B1 located on a leading end side of the magnetic head 17 and the welding point B2 located on a trailing end side of the head 17.

In the gimbal portion 44, the metal thin plate 46 integrally has a substantially rectangular tongue portion (support portion) 44a located on the tip side, a substantially rectangular base end portion (first end portion) 44b located on the base end side with a space between the tongue portion 44a, a pair of elastically deformable outriggers (link portions) 44c that respectively connect the base end portion 44b and the tongue portion 44a and displaceably support the tongue portion 44a, a connecting frame 44d extending from ore outrigger 44c through the tip side of the tongue portion 44a to the other outrigger 44c, and a substantially rectangular fixed pad portion (second end portion) 44e extending from the connecting frame 44d and facing the distal end portion of the tongue portion 44a. The fixed pad portion 44e is located between the connecting frame 44d and the tongue portion 44a.

The base end portion 44b is attached on the surface of the load beam 38 and spot-welded to the load beam 38 at the welding point. B1. The fixed pad portion 44e is spot-welded to the distal end portion of the load beam 38 at the welding point B2. The welding point B2 is located on a central axis C1 of the suspension 34.

As illustrated in FIGS. 3, 4 and 5, the tongue portion 44a is formed in a size and shape capable of mounting the magnetic head 17, and is formed, for example, in a substantially rectangular shape. The tongue portion 44a is disposed such that a center axis in a width direction thereof coincides with the central axis C1 of the suspension 34. The tongue portion 44a has a rear end portion located on the base end portion 44b side and a distal end portion located on the tip side of the suspension 34. Both side portions in the width direction of the rear end portion are connected to the outriggers 44c. In the present embodiment, a central portion in a longitudinal direction of the tongue portion 44a is narrowed to a width narrower than other portions.

A substantially central portion of the tongue portion 44a is in contact with a dimple (protrusion) 52 provided projecting at the distal end portion of the load beam 38. The tongue portion 44a can be displaced in various directions with the dimple 52 as a fulcrum by elastically deforming the pair of outriggers 44c and the connecting frame 44d. Thus, the tongue portion 44a and the magnetic head 17 mounted on the tongue portion 44a flexibly follow surface fluctuation of the magnetic disk 18 to be displaced in a roll direction or a pitch direction, so that a small gap can be maintained between the surface of the magnetic disk 18 and the magnetic head 17.

In the gimbal portion 44, the laminated member 48 of the flexure 42 is disposed on the metal plate 46, and extends from the base end portion 44b through the space to above the tongue portion 44a along the central axis C1. That is, the laminated member 48 has a base end portion 48a attached to the base end portion 44b, a distal end portion 48b attached to the tongue portion 44a, and a pair of strip-shaped bridge portions 48c extending from the base end portion 48a to the distal end portion 48b in a bifurcated shape. The distal end portion 48b constitutes the head mounting region in which the magnetic head 17 is mounted.

A plurality of connection pads (electrode pads) 54 are provided side by side in the width direction on the distal end portion 48b. A plurality of connection pads (electrode pads) 55 for connecting the piezoelectric elements 50 are further provided on the distal end portion 48b. The laminated member 48 has a plurality of signal wirings W extending from the connection pads 54 through both side edges of the distal end portion 48b to the base end portion 48a side, and a plurality of drive wirings W extending from the connection pads 55 to the base end portion 48a side. The signal wirings W and the drive wirings W extend over almost the entire length of the laminated member 48 and are connected to the connection pads 43 of the connecting end portion 42c. As illustrated in FIG. 4, a through-hole 86 is provided in a central portion of the distal end portion 48b, specifically in a region where the wiring W does not exist. The through-hole 86 is filled with the adhesive described below.

As illustrated in FIGS. 3, 4 and 5, the magnetic head 17 has a substantially rectangular slider, and a recording element (write head) and a read element (read head) (not shown) provided on the slider. The magnetic head 17 is placed on the tongue portion 44a so as to overlap the distal end portion 48b, and is fixed to the distal end portion 48b with the adhesive. The magnetic head 17 is disposed such that a central axis in a longitudinal direction thereof coincides with the central axis C1 of the suspension 34, and a substantially central portion of the magnetic head 17 is located above the dimples 52. The recording element and the read element of the magnetic head 17 are electrically connected to the connection pads 54 of the distal end portion 48b by a conductive adhesive such as solder or silver paste. Thus, the magnetic head 17 is connected to the signal wirings W of the laminated member 48 through the connection pads 54.

As the pair of piezoelectric elements 50, for example, rectangular plate-shaped thin film piezoelectric elements (PZT elements) are used. The piezoelectric element 50 is not limited to a thin film type (thickness of about 10 μm), but a bulk type or bulk laminated type (thickness of 40 μm or more) piezoelectric element may be used. The piezoelectric element 50 is not limited to the PZT element, but another piezoelectric element may be used. The drive element is not limited to the piezoelectric element, but another drive element that can extend and contract by applying a current may be used.

The piezoelectric elements 50 are arranged such that their longitudinal direction (extending and contracting direction) is parallel to the central axis C1 of the suspension 34. The two piezoelectric elements 50 are arranged on both sides of the magnetic head 17 in the width direction, and are arranged in parallel with each other. Both ends in the longitudinal direction of each piezoelectric element 50 are mounted on and electrically connected to the connection pads 55 of the distal end portion 48b. Thus, the piezoelectric elements 50 are connected to the drive wirings W of the laminated member 48 through the connection pads 55.

Next, a bonding structure of the magnetic head 17 will be described in detail.

Figure 6:
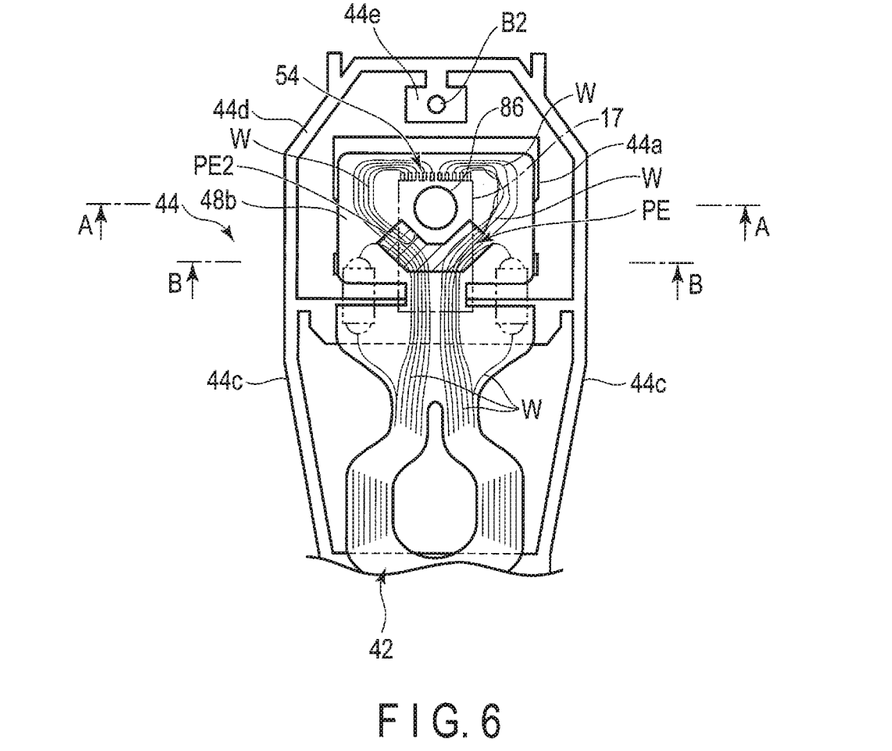
FIG. 6 is a plan view of a gimbal portion of the head suspension assembly shown with a cover insulating layer omitted.
Figure 7:
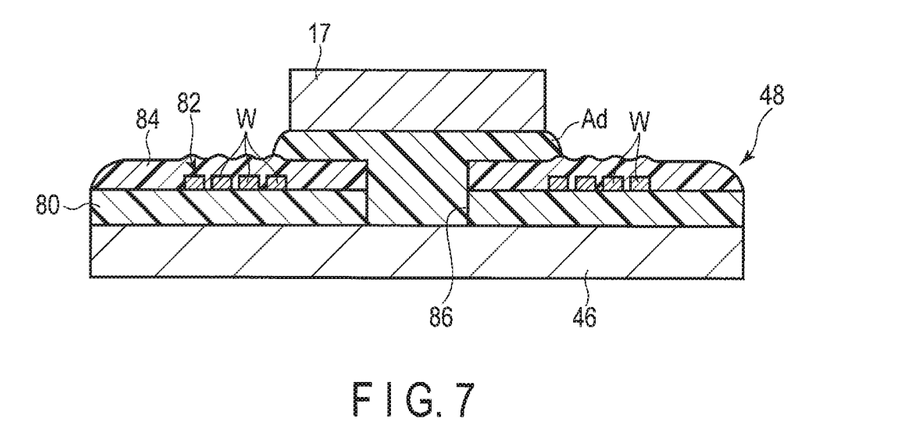
FIG. 7 is a cross-sectional view of the gimbal portion taken along a line A-A of FIG. 6.

FIG. 6 is a plan view of the gimbal portion 44 with the cover insulating layer omitted, FIG. 7 is a cross-sectional view of the gimbal portion taken along a line A-A of FIG.

Figure 8:
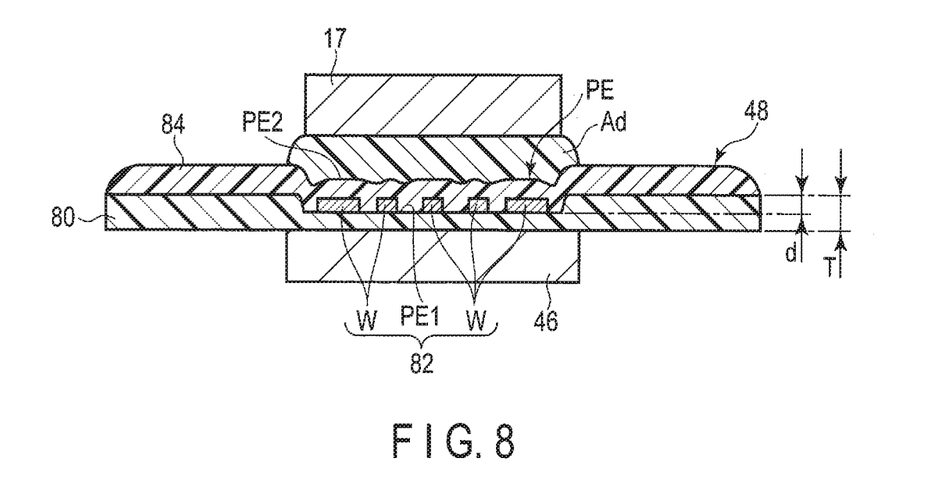
FIG. 8 is a cross-sectional view of the gimbal portion taken along a line B-B of FIG. 6.

6, and FIG. 8 is a cross-sectional view of the gimbal portion taken along a line B-B of FIG. 6.

As illustrated in FIG. 6, the distal end portion 43b of the laminated member (FPC) 43 is attached to the tongue portion 44a and constitutes the head mounting region in which the magnetic head 17 is mounted. In the head mounting region, the through-hole 86 is provided in the region where the wiring W does not exist. In the head mounting region, an etching region (a recess) PE is further provided in at least a part of a region where the wiring W exists. The magnetic head 17 is bonded and fixed onto the through-hole 86 and the recess PE with an adhesive Ad.

As illustrated in FIGS. 6 and 7, the distal end portion 48b of the laminated member 48 has a base insulating layer 80 fixed to the tongue portion 44a made of the metal plate 46, a conductive layer (wiring pattern) 82 that is formed on the base insulating layer 80 and includes the signal wirings W, the drive wirings W, and the connection pads, and a cover insulating layer 84 that covers the conductive layer 82 and is laminated on the base insulating layer 80. As the conductive layer, for example, the copper foil is used, and the signal wirings W, the drive wirings W, and the connection pads 54 and 55 are formed by patterning the copper foil. The through-hole 86 is formed to penetrate the base insulating layer 80 and the cover insulating layer 84.

The magnetic head 17 is bonded and fixed to the cover insulating layer 84 by the adhesive Ad filled in the through-hole 86 and on the cover insulating layer 84. Since the adhesive Ad filled in the through-hole 86 contacts a surface of the metal plate 46 and an inner peripheral surface of the through-hole 86, a contact area of the adhesive Ad is increased and an adhesive strength is increased.

As illustrated in FIGS. 6 and 8, a recess (first recess) PE1 is formed by partially etching a part of the base insulating layer 80 in the etching region PE of the distal end portion 48b. A depth d of the recess PE1 is about 30 to 70% of a layer thickness T of the base insulating layer 80. In one example, the layer thickness T of the base insulating layer 80 is 8 µm and the depth d of the recess PE1 is 3 to 5 µm. At least a part of the signal wiring W is provided on a bottom surface of the recess PE1. In the cover insulating layer 84 laminated on the base insulating layer 80, a region overlapping the recess PE1 and the signal wirings W is recessed depending on the depth of the recess PE1, and a recess (second recess) PE2 having a shape corresponding to the recess PE1 is formed. In one example, a film thickness of the conductive layer 82 (wirings W) is 9 µm, the layer thickness of the cover insulating layer 84 is about 4 µm, and the depth of the recess PE2 of the cover insulating layer 84 is 3 to 4 µm.

An area of a portion of the etching region PE facing the magnetic head 17 is about 20 to 70% of the area of the magnetic head 17 (area of a facing surface facing the distal end portion 48b). In the present embodiment, the etching region PE is formed in a substantially V shape so as to surround the through-hole 86 and overlap the signal wirings W.

The magnetic head 17 is bonded and fixed to the cover insulating layer 84 by the adhesive Ad filled in the recess PE2 and on the cover insulating layer 84. Since the adhesive Ad filled in the recess PE2 contacts a bottom surface and a side surface of the recess PE2, the contact area of the adhesive Ad with the base insulating layer 8 is increased and the adhesive strength is increased. The adhesive strength is increased by about 15% as compared with a case where the recess PE2 is not provided.

Thus, even when the magnetic head 17 is bonded and fixed onto a wiring portion, it is possible to secure sufficient adhesive strength of the adhesive Ad and stably fix the magnetic head 17 to the tongue portion 44a.

As illustrated in FIGS. 1 and 2, the board unit 21 integrally has a substantially rectangular base portion 58, an elongated strip-shaped relay portion 57 extending from the base portion 58, and the wiring board 51 continuously provided at a tip of the relay portion 57. The base portion 58, the relay portion 57, and the wiring board 51 are made of a flexible printed wiring board (FPC). The base portion 58 is disposed on the bottom wall 12a of the base 12, and the wiring board 51 is attached to an installation surface of the actuator block 29.

Electronic components such as a conversion connector (not shown) and a plurality of capacitors are mounted on the base portion 58. The wiring board 51 is provided with a large number of connection pads (not shown). The connecting end portions 42c of the flexures 42 of the suspension assemblies 30 described above are respectively joined to the connection pads of the wiring board 51 by, for example, soldering. A head IC (head amplifier) 53 is mounted on the wiring board 51, and the head IC 53 is connected to the connection pad and the base portion 58 through a plurality of wirings (not shown). Thus, the eight magnetic heads 17 of the actuator assembly 22 are electrically connected to the base portion 58 respectively through the wirings of the flexures 42, the connecting end portions 42c, the wiring board 51, the head IC 53, and the relay portion 57.

As illustrated in FIG. 1, the ramp load mechanism 2b has a ramp 60 provided on the base 12 and the tab 40 engageable with the ramp 60. As described above, the tab 40 is provided at the tip of the load beam 38 of the suspension assembly 30. The ramp 60 is fixed to the bottom wall 12a of the base 12 and is located near a peripheral edge of the magnetic disk 18. The ramp 60 includes a ramp body 62 formed in a block shape. Eight guide surfaces (guide portions) 64 respectively supporting and guiding the tabs 40 provided on the eight suspension assemblies 30 are formed on one side portion of the ramp body 62.

In the HDD configured as described above, during operation, the actuator assembly 22 is rotated about the support shaft 31 by the VCM 24, and the magnetic heads 17 are moved to desired seek positions while respectively facing the surfaces of the magnetic disks 18. As illustrated in FIG. 1, when the HDD is not operating, the actuator assembly 22 is rotated to the unload position where the magnetic head 17 is located outside the outermost periphery of the magnetic disk 18, and the tabs 40 of the suspension assemblies 30 respectively ride on the guide surfaces 64 of the corresponding ramps 60. Thus, the magnetic head 17 is held at the unload position away from the magnetic disk 19 by the ramp 60.

According to the HDD and the suspension assembly configured as described above, the etching region PE including the recesses PE1 and PE2 is provided in the head mounting region of the laminated member 48 on which the magnetic head 17 is mounted, and the magnetic head 17 is bonded and fixed to the recess PE2 in a state of being filled with the adhesive Ad. Since the adhesive Ad filled in the recess PE2 contacts the bottom surface and the side surface of the recess PE2, the contact area of the adhesive Ad with the cover insulating layer 84 is increased and the adhesive strength is increased. Thus, even when the magnetic head 17 is bonded and fixed onto the wiring portion, it is possible to secure sufficient adhesive strength of the adhesive Ad and stably fix the magnetic head 17 to the tongue portion 44a.

From the above, according to the present embodiment, the suspension assembly capable of stably bonding and fixing the head, and the disk device including the suspension assembly can be obtained.

Next, the suspension assembly according to a modification will be described. In various modifications described below, the same parts as those in the first embodiment described above are denoted by the same reference numerals, and detailed description thereof will be omitted or simplified. A configuration different from that of the first embodiment will be described in detail.

First Modification

Figure 9:
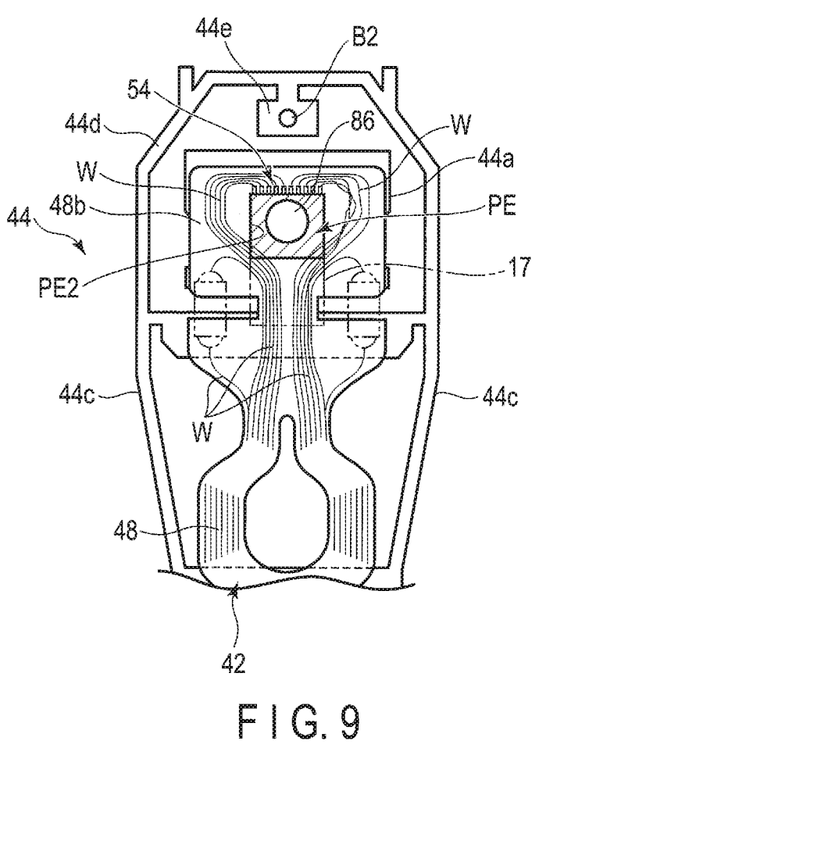
FIG. 9 is a plan view illustrating the gimbal portion of the suspension assembly according to a first modification.

FIG. 9 is a plan view schematically illustrating a gimbal portion of a suspension assembly according to a first modification with a cover insulating layer omitted.

As illustrated, according to the first modification, an etching region PE of a distal end portion 48b of a laminated member 48 is provided around a through-hole 86 in a head mounting region. A part of a signal wiring W extends through the etching region PE. The etching region PE is formed in a rectangular shape, and has a width substantially equal to the width of a magnetic head 17 and a length about half the length of the magnetic head 17 in the longitudinal direction.

Second Modification

Figure 10:
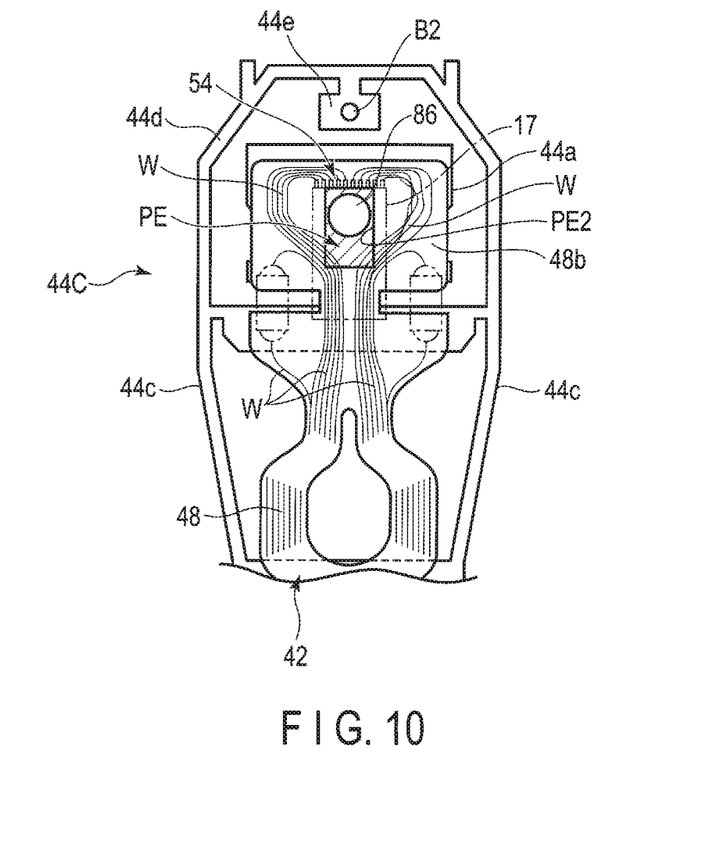
FIG. 10 is a plan view illustrating the gimbal portion of the suspension assembly according to a second modification.

FIG. 10 is a plan view schematically illustrating a gimbal portion of a suspension assembly according to a second modification with a cover insulating layer omitted.

As illustrated, according to the second modification, an etching region PE of a distal end portion 48b of a laminated member 48 is provided around a through-hole 86 in a head mounting region. A part of a signal wiring W extends through the etching region PE. The etching region PE is formed in a rectangular shape, has a width smaller than the width of a magnetic head 17 and substantially equal to a diameter of the through-hole 86, and extends from a tip of the magnetic head 17 to a substantially intermediate position in the longitudinal direction.

Third Modification

Figure 11:
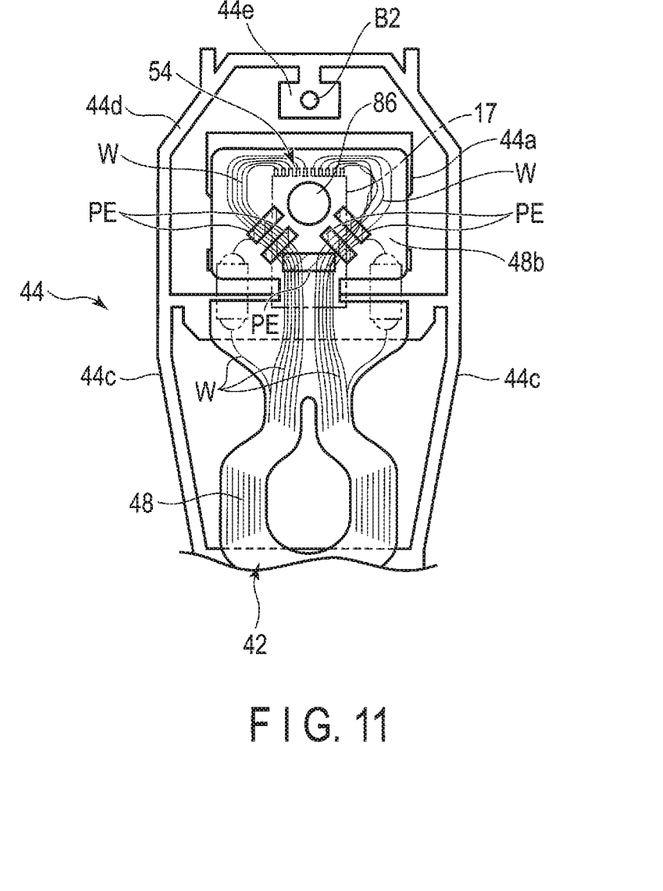
FIG. 11 is a plan view illustrating the gimbal portion of the suspension assembly according to a third modification.

FIG. 11 is a plan view schematically illustrating a gimbal portion of a suspension assembly according to a third modification with a cover insulating layer omitted.

As illustrated, according to the third modification, etching regions PE of a distal end portion 48b of a laminated member 48 are provided dispersedly at a plurality of locations in a head mounting region. That is, the distal end portion 48b is provided with the etching regions PE. Signal wirings W of the distal end portion 48b respectively extend through the etching regions PE. A part of the etching region PE may be located outside the head mounting region.

Fourth Modification

Figure 12:
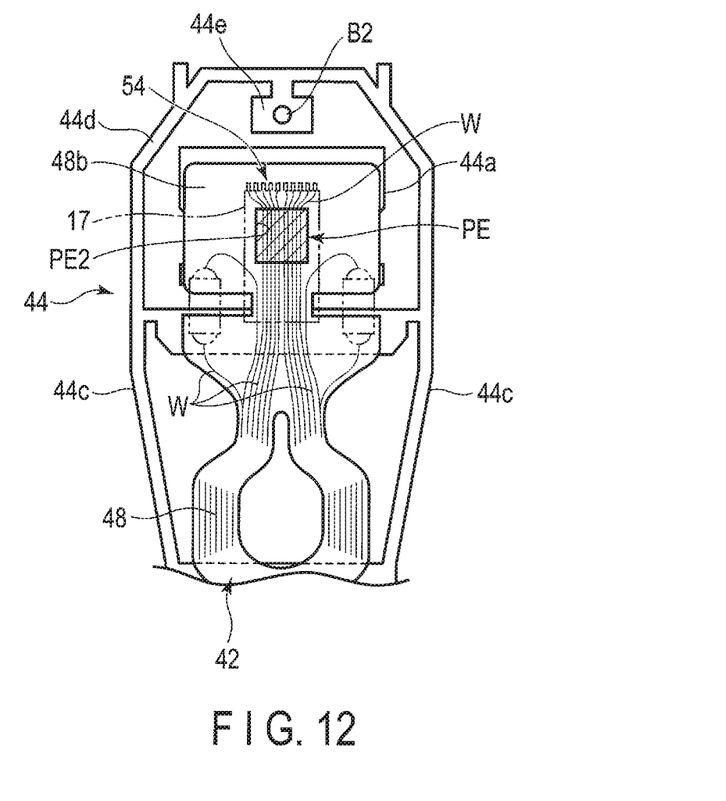
FIG. 12 is a plan view illustrating the gimbal portion of the suspension assembly according to a fourth modification.

FIG. 12 is a plan view schematically illustrating a gimbal portion of a suspension assembly according to a fourth modification with a cover insulating layer omitted.

As illustrated, according to the fourth modification, a through-hole of a distal end portion 43b is omitted, and a plurality of signal wirings W extend from connection pads 54 through a head mounting region (through under a magnetic head 17) to a base end side. An etching region PE is formed in a rectangular shape and is provided in a substantially central portion of the head mounting region. All the signal wirings W extend through the etching region PE.

In the first to fourth modifications, the configuration of the etching region PE is the same as that of the etching region PE in the first embodiment. That is, each etching region PE has a recess formed in the base insulating layer by partial etching, a part of the signal wiring provided on the bottom surface of the recess, and a recess in the cover insulating layer overlappingly provided on the recess. The magnetic head 17 is bonded and fixed to the cover insulating layer by the adhesive Ad filled between the cover insulating layer and the magnetic head 17 and in the etching region PE.

In the first to fourth modifications, other configurations of the suspension assembly 30 is the same as that of the suspension assembly in the first embodiment described above. In any of the first to fourth modifications, it is possible to obtain the suspension assembly capable of stably banding and fixing the magnetic head.

While certain embodiments and modifications have been described, these embodiments and modifications have been presented by way of example only, and are not intended to limit the scope of the inventions. Indeed, the novel embodiments and modifications described herein may be embodied in a variety of other forms; furthermore, various omissions, substitutions and changes in the form of the embodiments and modifications described herein may be made without departing from the spirit of the inventions. The accompanying claims and their equivalents are intended to cover such forms or modifications as would fall within the scope and spirit of the inventions.

For example, the etching region PE of the laminated member 48 is not limited to the rectangular shape, and any other shape can be selected. Further, the etching region is not limited to a case where the entire region is located in the head mounting region, but at least a part thereof may be located in the head mounting region. Materials, shapes, sizes and the like of the elements constituting the suspension assembly are not limited to those in the above-described embodiments, but can be variously changed as necessary. In the disk device, the number of magnetic disks is not limited to four, and may be three or less or six or more, and the number of suspension assemblies and the number of magnetic heads may be increased or decreased depending on the number of magnetic disks provided.

What is claimed is:
1. A suspension assembly comprising:
a support plate including a distal end portion and a base end portion;
a wiring member comprising a gimbal portion and provided on the support plate, the wiring member comprising a metal plate placed on the support plate; and a laminated member including a base insulating layer provided on the metal plate, a conductive layer provided on the base insulating layer to form a plurality of wirings and connection pads, and a cover insulating layer provided on the base insulating layer so as to overlap the conductive layer; and
a magnetic head mounted on the gimbal portion, wherein in the gimbal portion, the wiring member includes a head mounting region where the magnetic head is mounted, and an etching region including a recess located and formed at least partially in the head mounting region, and the magnetic head is bonded to the head mounting region of the wiring member by an adhesive filled in the head mounting region and the recess, in the gimbal portion, the metal plate includes a first end portion located on a side of the base end portion of the support plate with respect to the magnetic head and welded to the support plate, and a tongue portion which is displaceably supported with respect to the support plate and on which the magnetic head is mounted, and the laminated member includes a distal end portion disposed on the tongue portion, and the distal end portion includes the connection pad, the wirings, the head mounting region, and the etching region.

2. The suspension assembly of claim 1, wherein the etching region includes a first recess formed in the base insulating layer, at least a part of the wiring provided in the first recess, and a second recess formed in the cover insulating layer and overlapped on the first recess.

3. The suspension assembly of claim 2, wherein the first recess has a depth of 30 to 70% of layer thickness of the base insulating layer.

4. The suspension assembly of claim 1, wherein an area of a region located in the head mounting region of the etching region is 20 to 70% of that of the magnetic head facing the head mounting region.

5. The suspension assembly of claim 1, wherein the etching region includes a plurality of recesses provided at a plurality of locations in the head mounting region.

6. The suspension assembly of claim 1, wherein the wiring member includes a through-hole formed through the cover insulating layer and the base insulating layer in the head mounting region, the through-hole is filled with the adhesive, and the etching region is provided around the through-hole.

7. The suspension assembly of claim 1, wherein in the gimbal portion, the metal plate includes a second end portion located on the distal end portion side of the support plate with respect to the magnetic head and welded to the support plate, an elastically deformable outrigger connected to the first end portion and the tongue portion, and a connecting frame connected to the second end portion and the outrigger.

8. A disk device comprising:

a disk-shaped recording medium having a recording layer; and the suspension assembly of claim 1.

9. The disk device of claim 8 wherein the etching region includes a first recess formed in the base insulating layer, at least a part of the wiring provided in the first recess, and a second recess formed in the cover insulating layer and overlapped on the first recess.

10. The disk device of claim 9, wherein the first recess has a depth of 30 to 70% of layer thickness of the base insulating layer.

11. The disk device of claim 8, wherein an area of a region located in the head mounting region of the etching region is 20 to 70% of that of the magnetic head facing the head mounting region.

12. The disk device of claim 8, wherein the etching region includes a plurality of recesses provided at a plurality of locations in the head mounting region.

13. The disk device of claim 8, wherein the wiring member includes a through-hole formed through the cover insulating layer and the base insulating layer in the head mounting region, the through-hole is filled with the adhesive, and the etching region is provided around the through-hole.

14. The disk device of claim 8, wherein in the gimbal portion, the metal plate includes a second end portion located on the distal end portion side of the support plate with respect to the magnetic head and welded to the support plate, an elastically deformable outrigger connected to the first end portion and the tongue portion, and a connecting frame connected to the second end portion and the outrigger.

* * * * *